Figure 1:
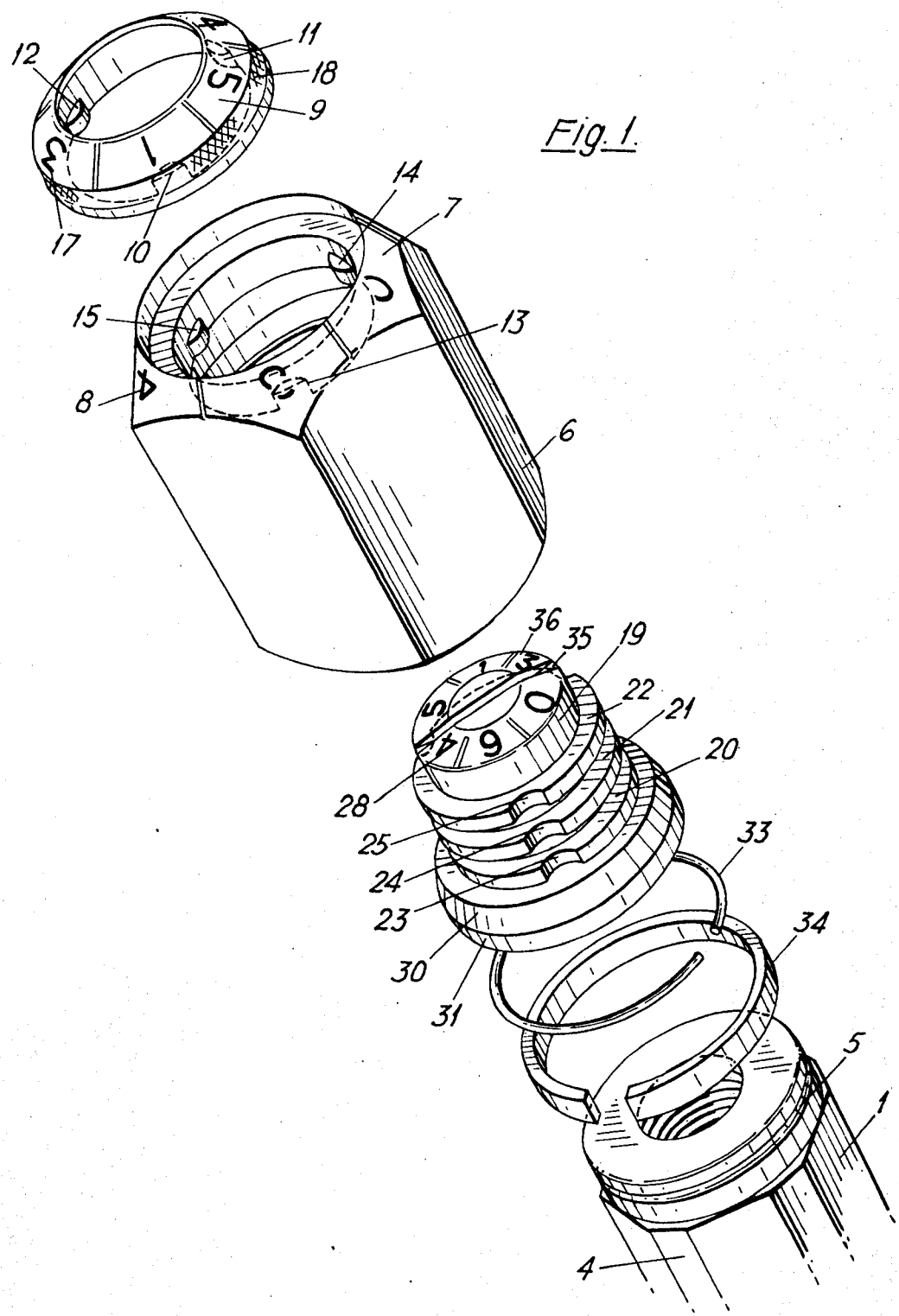

United States Patent [19]
Kay'Triniak

[11] 3,978,699
[45] Sept. 7, 1976

[54] LOCK

[75] Inventor: Edward Joseph Kay'Triniak, London, England

[73] Assignee: George Thomas Schlaefli, Tadworth, England

[22] Filed: May 1, 1975

[21] Appl. No.: 573,534

[52] U.S. Cl. .................................. 70/232; 70/131; 215/207
[51] Int. Cl.² ..................... F16B 41/00; B65D 55/14
[58] Field of Search ............ 70/131, 165, 172, 178, 70/231, 232, 287, 312; 215/9, 201, 207, 208

[56] References Cited
UNITED STATES PATENTS

| | | | |
|---|---|---|---|
| 551,151 | 12/1895 | Barney | 70/131 |
| 1,332,958 | 3/1920 | Segal | 70/131 |
| 1,525,954 | 2/1925 | Romano | 70/129 |
| 2,163,955 | 6/1939 | McWalters | 70/232 |

FOREIGN PATENTS OR APPLICATIONS

| | | | |
|---|---|---|---|
| 933,523 | 1/1948 | France | 70/232 |
| 1,351 | 1/1910 | United Kingdom | 215/207 |

Primary Examiner—Paul R. Gilliam
Assistant Examiner—C. F. Pietruszka
Attorney, Agent, or Firm—Owen, Wickersham & Erickson

[57] ABSTRACT

A lock adapted to be secured to an item having a peripheral groove adjacent one end thereof to prevent access to the member, such as a wheel nut. The lock has a locking member assembly comprising a housing with a movable member located at least partially within the housing which is adapted to urge a part circular ring into engagement with the groove to secure the lock in position. The locking member assembly comprises a combination lock selectively to prevent movement of the movable member.

5 Claims, 4 Drawing Figures

LOCK

This invention relates to a lock and more particularly to a lock suitable for preventing ready access to an item such as a nut, the head of a bolt, or other mechanism, such as, for example, an ignition switch in an automobile.

According to the broadest aspect of this invention there is provided a lock comprising a locking member assembly adapted to be secured to an item having engagement means thereon said locking member assembly comprising a housing, a member located at least partially within said housing and movable relative to said housing, a further member adapted to be urged into engagement with said engagement means to secure said housing to said item when said movable member is moved in one direction and adapted to move out of engagement with said engagement means to release said housing from said item when said movable member is moved in another direction, and lockable means for selectively preventing movement of said movable member. Said lockable means for preventing movement of said member may comprise any desired mechanism, such as a combination locking assembly a key barrel lock or the like. Said engagement means may comprise a peripheral groove or a recess or recesses in said item or may comprise an outwardly extending flange provided on said item.

Conveniently said movable member may be provided with a longitudinally extending flange, a free end of said flange being bevelled and adapted to engage with a spring to move said spring to engage with said engagement means when said longitudinally movable member is moved in said one direction and said flange may be peripheral flange provided on a disc secured to said movable member, said spring being a part circular spring.

Advantageously said movable member may comprise a post provided with one or more fins extending radially therefrom said fin or fins each being provided with at least one peripheral indentation, the housing being provided with at least one lug corresponding to said peripheral indentation or indentations. Conveniently the housing may also be provided with a rotary locking member secured thereto, said locking member also being provided with at least one lug corresponding to said peripheral indentation or peripheral indentations and advantageously the post may be provided with three radial extending fins having peripheral indentations.

According to a further aspect of this invention there is provided a locking member assembly, an item provided with means defining a peripheral groove, said locking member assembly being adapted to be releasably secured to said item, said locking member assembly comprising a housing defining a central channel therethrough, at least one lug provided on said housing protruding into said channel, an annular locking member rotatably mounted on said housing and defining a central aperture co-aligned with the said channel, at least one lug provided on said locking member, a central post rotatably mounted within said central channel a plurality of fins radially extending outwardly from said post and each defining peripheral indentations therein, the indentations in one fin corresponding to the lug or lugs of the housing and the indentations in another fin corresponding to the lug or lugs of the locking member, the lugs being located adjacent said fins with a longitudinally extending flange secured to said post, one end of said flange member being chamfered, and a spring located within said passage and adapted to be urged inwardly into engagement with said groove by movement of said post and said flange relative to said housing.

Conveniently the post, housing and locking member may be provided with indicia to enable them to be located in a predetermined relative position.

Conveniently the fins each define a plurality of peripheral indentations some of the indentations being of less depth than the remaining indentations, the lugs having corresponding dimensions.

Figure 2:
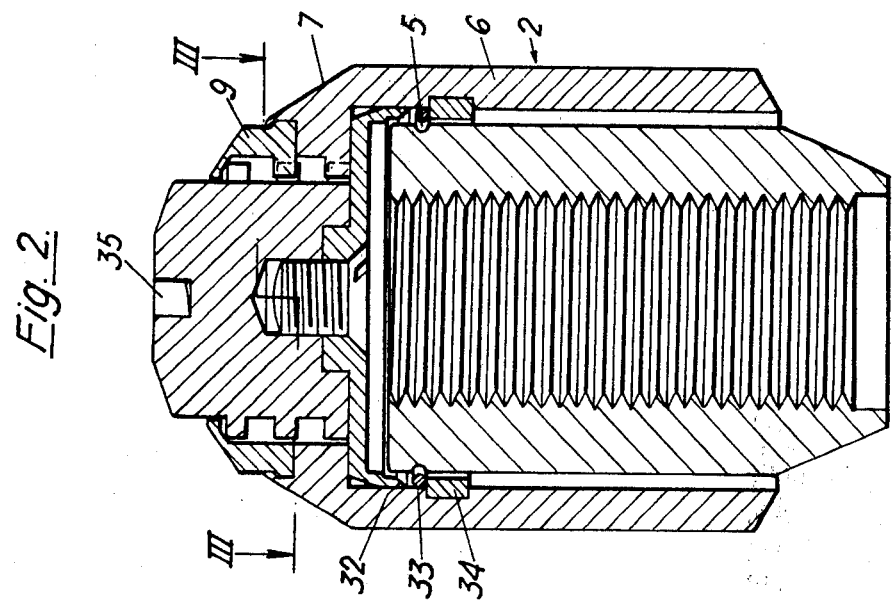
Figure 3:
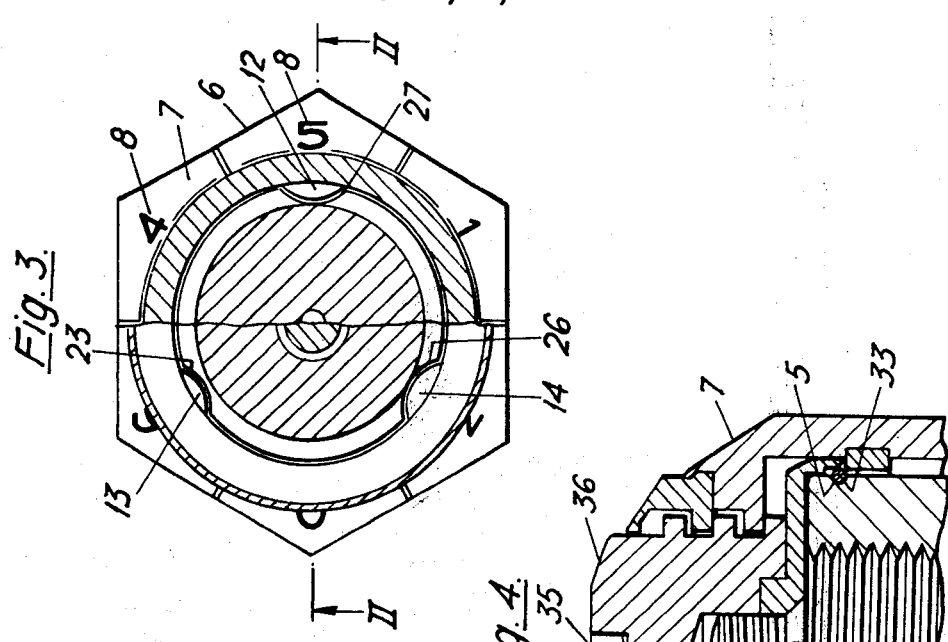
Figure 4:
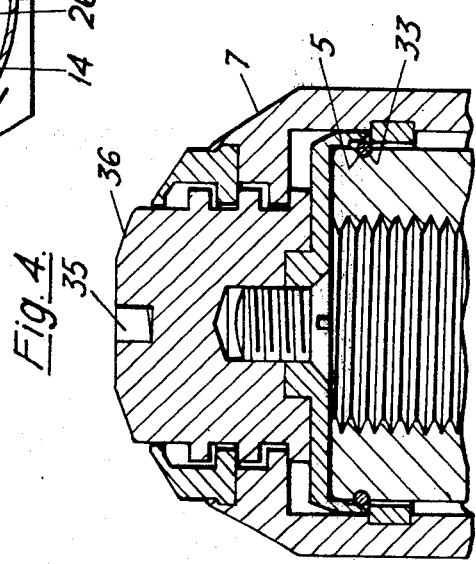

In order that the invention may be more readily understood, and so that further features thereof may be more readily appreciated, one embodiment of a nut lock in accordance with the invention will now be described by way of example with reference to the accompanying drawings in which:

FIG. 1 is an exploded perspective view of a lock in accordance with the invention in the form of a nut lock, FIG. 2 is a vertical sectional view of the lock of FIG. 1 in one condition taken along the line II—II in FIG. 3, FIG. 3 is a horizontal sectional view of the lock nut of FIG. 1 taken along the line III—III in FIG. 2 and FIG. 4 is a further vertical sectional view of part of the lock shown in FIG. 1, corresponding to FIG. 2 but showing the lock in an alternative condition.

Referring to the drawings a nut 1 to be locked by a locking device 2 in accordance with this invention comprises a body having a central internally threaded bore 3 and an outer shaped surface 4 adapted to be engaged by a spanner or similar tool. Adjacent one end of the nut there is a peripheral groove 5 formed in the outer wall of the nut.

A locking device 2 in accordance with the invention comprises a locking member assembly having a housing 6 having a substantially hexagonal outer surface and having an axially extending inner bore of considerable diameter extending from one end of said housing to a point adjacent the other end of the housing. The housing 6 is thus adapted to embrace and surround the shaped surface 4 of the nut 1. A further axially extending bore is provided which extends from the other end of the housing, and the two axially extending bores communicate with each other thus defining a passage which extends right through said housing 6. The end of the housing 6 from which said further bore extends is provided with a chamfered end surface 7, and the chamfered end surface 7 is provided with a plurality of indicia 8 engraved, embossed or otherwise formed thereon. An aperture is formed in said chamfered end surface 7 by a terminal portion of said further bore which is of enlarged diameter, and mounted rotatably on said housing 6 within said aperture is an annular locking member 9 which is provided with a relatively large central aperture therethrough which is co-aligned with and which has the same diameter as the said further bore. Both the locking member 9 and the housing 6 are provided with three radially inwardly protruding arcuate lugs 10, 11, 12 and 13, 14, 15 respectively which extend into said central aperture and said further bore respectively, one of the three lugs 10 on the locking member 9 and one of the three lugs 13 on the housing 6 being of lesser radial extent than the remaining lugs. The outer surface of the annular locking member 9 is chamfered, and is provided a plurality of indicia 17 engraved, embossed or otherwise formed thereon. An outer peripheral edge portion 18 of the annular locking member 9 is milled. The locking member 9 is retained in position by a portion of the housing 6 adjacent the aperture formed in the chamfered end surface 7 which is swaged to embrace the locking member 9. However, the locking member 9 is manually rotatable within the housing 6.

A cylindrical post 19 is rotatably mounted so as to extend through the central aperture of the locking member 9 and through the said further bore extending through the housing 6 provided with the lugs, and the post is provided with three radially extending fins 20, 21, 22 each fin being provided with three arcuate peripheral indentations 23, 24, 25, 26, 27 the peripheral indentations corresponding with the shape of the lugs and, in one predetermined relative position of the post 19, the locking member 9 and the housing 6, being coaligned with the lugs. One peripheral indentation 23, 24, 25 on each fin 20, 21, 22 is of less depth than the remaining two peripheral indentations and the corresponding peripheral indentations on the three fins are, in this embodiment of the invention, mutually coaligned. A transverse slot 36 is provided in the end surface of the post which protrudes through the aperture provided in the locking member 9, and this end surface of the post is slightly chamfered 36 and is provided with a plurality of indicia 28 which are engraved, embossed, or otherwise formed thereon.

Secured to the base of the post 19 by means of a screw 29 is a radially extending disc 30 having an axially extending flange 31 at the outer peripheral edge thereof i.e. a flange which tends around the periphery of the disc 30 and which is perpendicular to the plane of the disc. The innermost edge of the end of the flange 31 remote from the post is chamfered 32 for a reason which will be explained hereinafter.

Located within the housing 6 adjacent the chamfered end of the flange 31 is a radially outwardly biassed part circular spring 33 adapted to be seated releasably on an inwardly protruding annular member 34 provided within the housing 6, the spring 33 being located between the member 34 and the flange 31. The diameter of disc 30 is greater than the diameter of the said further bore and is also larger than the diameter of the aperture defined by said inwardly protruding annular member 34, and thus the disc 30 is effectively trapped in position whilst having a limited freedom of movement, the post 19 also being movable with a similar freedom of movement, since the post 19 is secured to the disc 30.

The operation of the lock will now be described, and for the purposes of this description it is to be understood that the lock is initially in an unlocked condition as shown in FIGS. 2 and 3. When in this condition each of the lugs 10–15 of the locking member 9 and the housing 6 are located in alignment with the corresponding peripheral indentations 23–27 of the fins 20-22 on the post 19. The disc 30 secured to the post 19 having the flange 31 thereon is in a retracted or upper position as shown in FIG. 2 and the part circular spring 33 is in its outwardly biassed position in which it is located adjacent the wall of the housing 6 seated on the inwardly protruding annular member 34. It will be appreciated that with the lock in this condition the housing 6 may be placed over the object to be secured, in this example a nut 1, so that the spring 33 is located adjacent the peripheral groove 5 in the nut. The spring 33, in this condition of the lock, does not engage with the groove 5, and thus, with the lock in this condition the housing 6 may also be removed from the nut 1, thus exposing the shaped surface 4 of the nut 1.

To lock the lock post 19 is moved by the application of pressure on the end surface thereof, and for this purpose a tool or a coin may be inserted into the slot 26 in the end surface of the post 19, although the post may be moved merely manually. As the post moves the disc 30 will also move and the inwardly chamfered edge 32 of the flange 31 will engage with the part circular spring 33 and since the part circular spring is seated on the inwardly protruding annular member 34 part of the flange 31 will move between the spring 33 and the inner wall of the housing and the spring 33 will be urged inwardly until a portion of the spring 33 is accommodated in the peripheral groove 5 of the nut 1. After the post 19 has been moved in this fashion the lugs 10–15 on the locking member 9 and the housing 6 will be located adjacent channels defined between the fins 20–22 on the post 19, and to effect locking the post 19, the housing 6 and the locking member 9 may be moved rotationally relatively to one another thereby ensuring that the lugs 10–15 are no longer aligned with the corresponding peripheral indentations 23–27 of the fins 20–22. Thus the post 19 is prevented from further axial movement by the engagement of the lugs 10–15 with the fins 20–22, although the post 19 may still be rotated relative to the housing 6 and the locking member 9.

Thus the locking device 2 is secured to the nut 1 which is to be safeguarded. The housing 6 rotates freely about the nut 1 since the spring 33 merely engages the peripheral groove 5 thus preventing the lock from being removed from the nut 1 whilst permitting the housing 6 to be freely rotated thereon.

In order to release the lock the lugs 10–15 on the locking member 9 and the housing 6 must be correctly aligned with the corresponding peripheral indentations 23–27 of the fins 20–22 of reduced height. It will be understood that the lugs 10–15 must be positioned with the lugs of least height 10, 13 being aligned with the peripheral indentations 23, 25 of less depth of the fins whilst the remaining lugs 11, 12, 14, 15 must be located adjacent the corresponding peripheral indentations of the fins. When the locking member 9, the housing 6 and the post 19 are correctly aligned relative to one another the pressure of the part circular spring 33 acting against the chamfered portion 32 of the flange 31 will move the post 19 outwardly of the housing 6 enabling the part circular spring 33 to expand until is again comes into contact with the inner wall of the housing 6 and is again seated on annular member 34, thus enabling the housing 6 to be removed from the nut 1. Whilst the post 19 is in this releasing position the lugs 10–15 will be accommodated within the peripheral indentations 23–27 of the fins 20–22 and thus the locking member 9, the housing 6 and the post 19 may not be moved with respect to one another, thus ensuring that when the lock is replaced on the member to be secured the lock is in an ideal condition for instant operation to resecure that member.

It will be appreciated that the indicia 8, 17, 28, are provided on the elements of the lock so that a person aware of the appropriate combination number may bring the lock to the releasing position by moving the elements of the lock so that appropriate indicia are co-aligned.

It will also be appreciated that the peripheral indentations provided in the fins 20-22 need not be mutually co-aligned, and need not be arcuate in shape, but may be, for example, rectangular. Furthermore whilst in the described embodiment each fin is provided with three peripheral indentations it will be appreciated that in other embodiments each fin may be provided with one, two or more peripheral indentations, the number of lugs provided being selected appropriately. In a very simple embodiment of the invention only one fin may be provided, and only the housing need be provided with lugs.

Whilst the present invention has been specifically described with relation to an embodiment in the form of a lock for a nut it is to be understood that the invention may be applied to provide a locking mechanism for a wide variety of uses.

In particular the invention may be utilised to provide a releasable cover that may be secured over the face of another lock, electrical switch button or the like. Similarly, it will be understood that the lock may be a key operable lock rather than a combination locking mechanism.

I claim:

1. A locking member assembly, an item provided with means defining a peripheral groove, said locking member assembly being adapted to be releasably secured to said item, said locking member assembly comprising a housing, defining a central channel therethrough, at least one lug provided on said housing protruding into said channel, an annular locking member rotatably mounted on said housing and defining a central aperture co-aligned with the said channel, at least one lug provided on said locking member, a central post rotatably mounted within said central channel a plurality of fins radially extending outwardly from said post and each defining peripheral indentations therein, the indentations in one fin corresponding to the lug or lugs of the housing and the indentations in another fin corresponding to the lug or lugs of the locking member the lugs being located adjacent said fins with a longitudinally extending flange secured to said post, one end of said flange member being chamfered, and a spring located within said passage and adapted to be urged inwardly into engagement with said groove by movement of said post and said flange relative to said housing.

2. A locking member according to claim 1 wherein the post, housing and locking member are provided with indicia to enable the respective members to be located in a predetermined relative position.

3. A locking member according to claim 1 wherein the fins each define a plurality of peripheral indentations some of the indentations being of less depth than the remaining indentations, the lugs having corresponding dimensions.

4. A lock comprising a locking member assembly adapted to be secured to an item having engagement means thereon, said locking member assembly comprising
   a housing,
   a longitudinally movable member located at least partially within said housing, and movable relative to said housing, said movable member being provided with a longitudinally extending flange having a bevelled free end
   a spring adapted to be engaged by said bevelled free end and to be urged into engagement with said engagement means to secure said housing to said item when said longitudinally movable member is moved in one direction and adapted to move out of engagement with said engagement means to release said housing from said item when said movable member is moved in another direction, and
   lockable means for selectively preventing movement of said movable member.

5. A lock according to claim 1 wherein said flange is a peripheral flange provided on a disc secured to said movable member, said spring being a part circular spring.

* * * * *

UNITED STATES PATENT AND TRADEMARK OFFICE
CERTIFICATE OF CORRECTION

PATENT NO. : 3,978,699
DATED : September 7, 1976
INVENTOR(S) : Edward Joseph Kay'Triniak It is certified that error appears in the above-identified patent and that said Letters Patent are hereby corrected as shown below:

Column 6, line 37, which is line 1 of claim 5,

"claim 1" should read --claim 4--.

Signed and Sealed this

Twenty-second Day of February 1977

[SEAL]

Attest:

RUTH C. MASON
Attesting Officer

C. MARSHALL DANN
Commissioner of Patents and Trademarks